United States Patent [19]

Uchiyama

[11] 4,356,879
[45] Nov. 2, 1982

[54] MANIPULATION DEVICE FOR A TRANSMISSION APPARATUS

[75] Inventor: Shintaro Uchiyama, Fuchu, Japan

[73] Assignee: Fuji Jukogyo Kabushiki Kaisha, Tokyo, Japan

[21] Appl. No.: 174,386

[22] Filed: Aug. 1, 1980

[30] Foreign Application Priority Data

Oct. 2, 1979 [JP] Japan .................................. 54-127189

[51] Int. Cl.³ ........................ B60K 17/34; B60K 41/22
[52] U.S. Cl. ...................................... 180/247; 74/475; 180/70 MS
[58] Field of Search ................. 180/247, 24.1, 70 MS; 74/477, 475, 473 R

[56] References Cited

U.S. PATENT DOCUMENTS

| | | | |
|---|---|---|---|
| 2,329,916 | 9/1943 | Lamb et al. | 180/247 |
| 3,283,298 | 11/1966 | Kaiser | 180/247 X |
| 4,170,273 | 10/1979 | Kodama et al. | 74/475 X |

*Primary Examiner*—John A. Pekar
*Attorney, Agent, or Firm*—Martin A. Farber

[57] ABSTRACT

A manipulation device for a transmission for four-wheel drive motor vehicle comprising a sub-transmission to transmit the power of the engine to a main transmission, a clutch device for selectively connecting or disconnecting the transmission of the output to either the front or rear axle, a shift rail for shifting a clutch in the sub-transmission, an actuating rail, a fixed rail, a shift fork slidably mounted on the actuating rail and on the fixed rail and engaged with the clutch device, and an arm slidably mounted on the actuating rail, shift rail and fixed rail. A first interlock for causing the actuating rail and shift fork to come into fixed engagement relation to each other within a first moving range of the actuating rail, and second interlock provided for causing the actuating rail and shift rail to come into fixed engagement relation to each other within a second moving range whereby at an end of the first moving range, the front wheel driving transmission is provided, and at the middle position the high speed four wheel driving transmission, and at other end of the second moving range the low speed four wheel driving transmission are provided.

8 Claims, 7 Drawing Figures

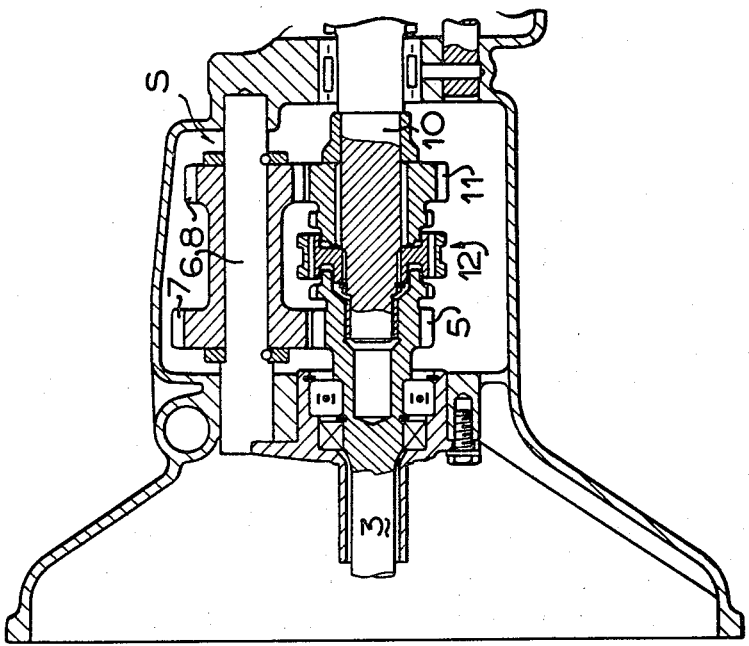

MANIPULATION DEVICE FOR A TRANSMISSION APPARATUS

BACKGROUND OF THE INVENTION

The present invention relates to a manipulation device for a transmission apparatus for four-wheel drive motor vehicles, which can also be driven selectively by only the front wheels or rear wheels, and more particularly to a transmission apparatus having a sub-transmission combined with a main transmission and a clutch device for disconnecting the transmission of the power to either of the front or rear wheels, whereby the car may be driven in a high power four wheel driving range and an economical four wheel driving range.

Such an apparatus including the sub-transmission and the clutch device must be provided with a shift lever for manipulating the sub-transmission and another shift lever for manipulating the clutch device. This increases the difficulties in manipulation of the transmissions and clutch device.

In order to overcome these problems, there is disclosed in U.S. Pat. No. 4,170,273, a transmission apparatus for four-wheel drive motor vehicles in which a sub-transmission and clutch device can be manipulated by one shift lever to change the transmission speed of the sub-transmission and to convert the four-wheel drive into the two-wheel drive by the front wheels.

The manipulation device for the transmission apparatus comprises a shift rod axially slidably provided for shifting a clutch means for the sub-transmission, an actuating rod slidably provided in parallel with the shift rod, a shift lever connected to the actuating rod, a shift fork slidably mounted on the actuating rod and engaged with the clutch device, a first engaging means for causing the actuating rod and shift fork to come into the fixed engagement relation to each other within a first moving range of the shift lever, second engaging means provided for causing the actuating rod and shift rod to come into fixed engagement relation to each other within a second moving range of the shift lever adjacent the first moving range, and a stopper provided on a guide plate for stopping the shift rod and shift fork.

In such a device, the stopper secured to the guide plate is subjected to shifting forces through the shift rod and shift fork. As a result, the guide plate and cover thereof are liable to be damaged by the forces. Deformation of the cover causes the malfunction of the apparatus and/or oil leakage.

SUMMARY OF THE INVENTION

The object of the present invention is to provide a manipulation device for a transmission apparatus having a high stiffness which ensures a reliable operation.

In accordance with the present invention, the manipulation apparatus comprises a shift rail axially slidably provided for shifting said clutch means in said sub-transmission, an actuating rail slidably provided in parallel with said shift rail, a fixed rail fixedly provided in parallel with said shift rail and said actuating rail, a shift lever connected to said actuating rail, a shift fork slidably mounted on said actuating rail and said fixed rail, said shift fork connected to said clutch device, an arm secured to said shift rail and slidably engaged with said actuating rail and said fixed rail, first interlock means provided between said actuating rail and said shift fork and fixed rail for causing said actuating rail and the shift fork to come into fixed engagement relation to each other within a first moving range of said actuating rail, thereby to shift the shift fork by manipulating said shift lever, and for causing said shift fork said fixed rail to engage with each other within a second moving range of said actuating rail, second interlock means provided between said actuating rail and said arm and said fixed rail for causing said actuating rail and said arm to come into fixed engagement relation to each other within the second moving range of said actuating rail adjacent said first moving range thereby to shift said shift rail, and for causing said arm and said fixed rail to engage with each other within said first moving range of said actuating rail, and a snap ring provided between said shift fork and said arm on said actuating rail for moving said shift fork and said arm.

BRIEF DESCRIPTION OF THE DRAWINGS

FIG. 1b is a sectional view showing a right half of the transmission, FIG. 2 is a sectional view taken along the line II—II of FIG. 1a, FIG. 3 is a sectional view taken along the line III—III of FIG. 1a, FIG. 4 is a sectional view taken along the line IV—IV of FIG. 1b, FIGS. 5a and 5b are illustrations for showing the operation of manipulation device of the present invention.

DESCRIPTION OF THE PREFERRED EMBODIMENTS

Figure 1A:
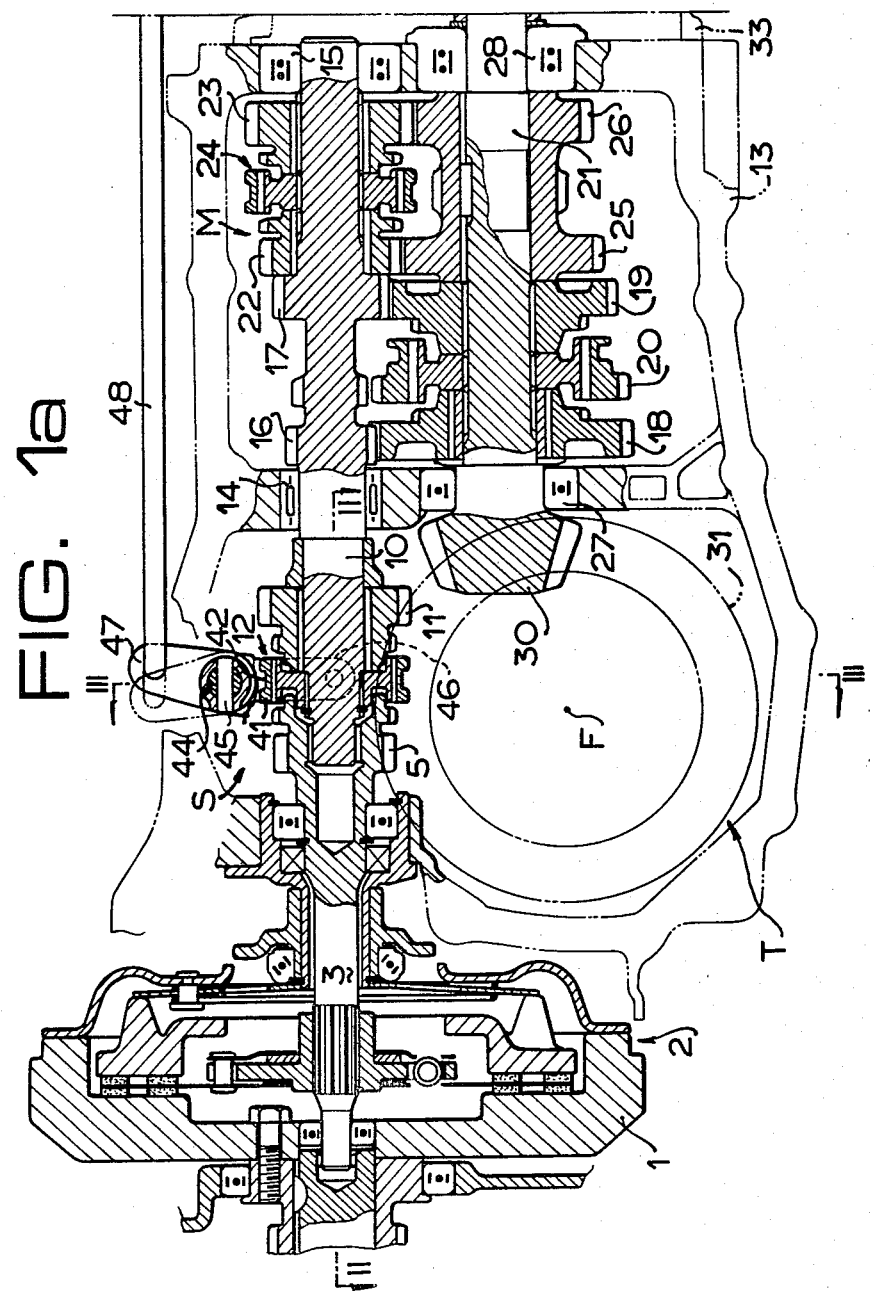
FIG. 1a is a sectional view showing a left half of a transmission for which the present invention is applied.
Figure 3:
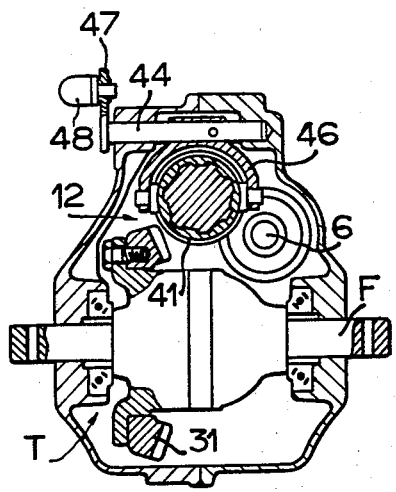

Referring to the drawings, a flywheel 1 is secured to the end of crankshaft of the engine which is longitudinally disposed in the front portion of car. A first main drive shaft 3 in alignment with the crankshaft is rotatably supported and a clutch device 2 is provided on the first main drive shaft to engage with the flywheel 1 for transmitting the power of the engine. A 2-speed sub-transmission S is positioned above the front axle F and provided to transmit the power of the engine to a second main drive shaft 10. The sub-transmission S, as shown in FIG. 2, comprises a gear 5 formed on the first main drive shaft 3, counter geras 7 and 8 rotatably mounted on a counter shaft 6, a gear 11 rotatably mounted on the second main drive shaft 10, and an inertia lock type synchromesh mechanism 12 as a clutch means for the subtransmission mounted on the second main drive shaft 10 with the spline. The gears 5 and 11 mesh with the gears 7 and 8 respectively.

The second main drive shaft 10 is in alignment with the first main drive shaft 3 and extended into a transmission case 13 of a 4-speed main transmission M and rotatably supported by bearings 14 and 15. The main transmission M comprises a lower 2-speed transmission device and a higher 2-speed transmission device. The lower 2-speed transmission device comprises gears 16 and 17 formed on the second main drive shaft 10, gears 18 and 19 rotatably mounted on a third main drive shaft 21 and engaged with the gears 16 and 17, respectively, and a lower speed stage synchromesh mechanism 20 splined on the shaft 21 between the gears 18 and 19. The higher 2-speed transmission device comprises gears 22 and 23 rotatably mounted on the second main drive shaft 10, a higher speed stage synchromesh mechanism 24 splined on the shaft 10 between the gears 22 and 23, gears 25 and 26 keyed on the third main drive shaft 21 and engaged with the gears 22 and 23 respectively. It should be noted that the back reverse gear mechanism is not shown in the drawings.

The third main drive shaft 21 is rotatably supported by bearings 27 and 28 and provided with a hypoid pinion 30 formed at the front end thereof. The hypoid pinion 30 meshes with a ring gear 31 of a final reduction gear device mechanism T. The final reduction gear device is positioned beneath the sub-transmission S in the space between the clutch device 2 and the main transmission M, and adapted to transmit the output of the third main drive shaft 21 to the front wheel through the front axle F. The rear end of the third main drive shaft 2 extends out of the transmission case 13, on which a gear 37 is fixed.

On the rear end of the transmission case 13 there is provided a housing 33 in which a rear wheel drive shaft 34 is rotatably supported by bearings 35 and 36. On the rear wheel drive shaft 34 there is rotatably mounted a gear 38 which engages the gear 37. A rear wheel drive synchromesh mechanism 40 of a clutch device N for the four wheel drive is mounted on the rear wheel drive shaft with a spline. The rear wheel drive shaft 34 is connected to a rear axle through a propeller shaft (not shown).

Figure 4:
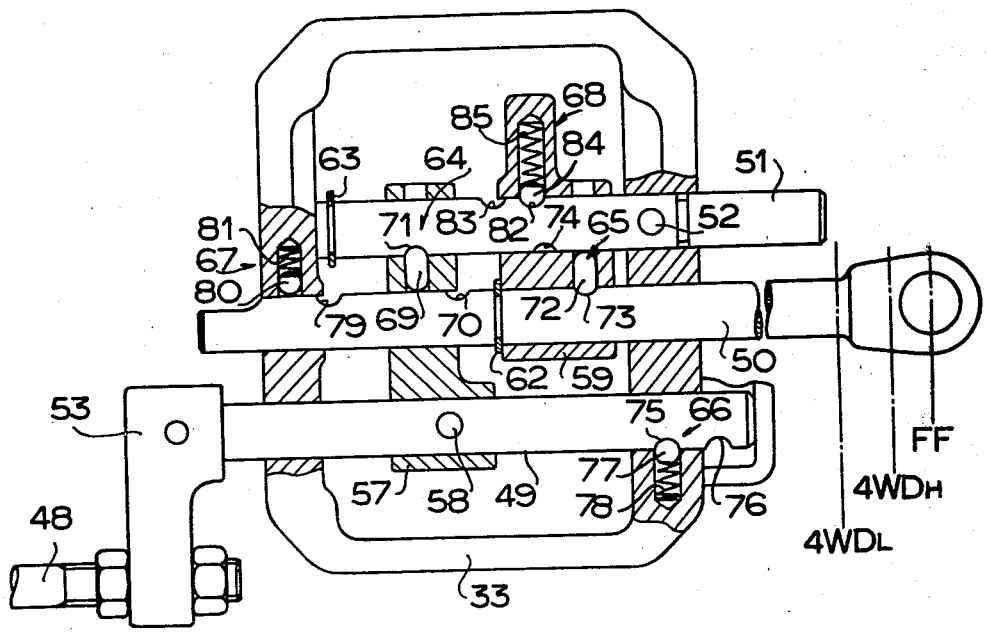

A device for manipulating the clutch means in the sub-transmission S and for coupling the third main drive shaft 21 to the rear wheel drive shaft 34 will be described hereinafter. In the sub-transmission S, a shift fork 46 is secured to a shaft 44 with a pin 45 and opposite ends of the shift fork are slidably engaged with a circumferential groove 42 of a sleeve 41 which is a part of the synchromesh mechanism 12 as a well known mechanism. A lever 47 secured to the shaft 44 is pivotally connected to one end of a link 48, the other, rear end of which is connected to a shift rail 49 through a connecting member 53 (FIG. 4). The shift rail 49 is slidably supported in the housing 33. Referring to FIG. 4, in parallel with the shift rail 49, an actuating rail 50 is slidably provided and a fixed rail 51 is secured to the housing 33 by a pin 52. The rear end of the actuating rail 50 is connected to a shift lever 54 by a ball joint. The shift lever 54 is pivotally mounted on a bracket 55 by a pin 56.

As shown in FIG. 1b, the shift lever 54 is moved to a front wheel driving position FF, a high speed four wheel driving position 4WDH and a low speed four wheel driving position 4WDL, so that the actuating rail 50 may be moved to the three positions.

An arm 57 is secured to the shift rail 49 by a pin 58 and is slidably engaged with the rails 50 and 51. A shift fork 59 is slidably engaged with the actuating rail 50 and the fixed rail 51. An end of the shift fork 59 is engaged with a groove 61 of a sleeve 60 of the synchromesh mechanism 40, as shown in FIG. 1b. A snap ring 62 is engaged on the actuating rail 50 between the arm 57 and the shift fork 59 so as to be able to move the arm and the fork, respectively. To the fixed rail 51, a snap ring 63 is secured so as to restrict forward movement of the arm 57.

Between the actuating rails 50 and 51, a first interlock means 64 is provided. The interlock means comprises an interlock pin 69 (which is slidably disposed in a guide slot in the arm 57 having an elongated cross-section) slidably provided in the arm 57, a notch 70 on the rail 50, and a notch 71 on the rail 51. A second interlock means 65 is also provided between the rails 50 and 51.

The second interlock means comprises an interlock pin 72 (which is slidably disposed in a guide slot in the shift fork 59 having an elongated cross-section) slidably provided in the shift fork 59, a notch 73 on the rail 50 and a notch 74 on the rail 51. A ball lock means 66 comprises notches 75 and 76 on the rail 49 and a ball 77 urged to the rail 49 by a spring 78 in the housing 33. A ball lock means 67 comprises a notch 79 on the rail 50, a ball 80 and a spring 81 in the housing 33. A ball lock means 68 comprises notches 82 and 83 on the rail 51, a ball 82 and a spring 85 in the shift fork 59. A cover 86 is secured to the housing 33 by bolts 87 as shown in FIG. 1b.

In operation, for the front wheel driving, the shift lever 54 is shifted to the front wheel driving position FF in FIG. 1b. The actuating rail 50 is positioned in the right extreme end (FIG. 4), whereby the shift fork 59 is located in the right position by the snap ring 62, where the pin 72 engages the notch 73 of the actuating rail 50 and the lock ball 84 engages the notch 82 of the fixed rail 51. In this position, the sleeve 60 of the synchromesh mechanism 40 is shifted to the right position, so that the clutch device N of the mechanism does not engage the gear 38. Thus, the power of the engine is not transmitted to the rear wheel. The arm 57 and shift rail 49 are also in the right position, where the ball 77 engages the notch 75 of the shift rail 49 to fix the rail.

In this position, the link 48 is in the right position, so that the shift fork 46 is actuated to shift the sleeve 41 of the synchromesh 12 of the sub-transmission S in the left direction to couple the clutch device between the gear 5 and the synchromesh 12.

Thus, the power of the engine is transmitted through the clutch device 2, the first main drive shaft 3, the gear 5 and the sleeve 41 of the synchromesh mechanism 12 to the second main drive shaft 10 without reduction by the sub-transmission S. The main transmission M transmits the rotation of the second main drive shaft 10 to the third main drive shaft 21 by means of the 4-speed transmission gear means. More particularly, if the synchromesh mechanism 20 is actuated by manipulating a shift lever (not shown) to couple the clutch device between the synchromesh mechanism and the gear 18, the third main drive shaft 21 is rotated at the lowest, first speed. If the clutch device between the synchromesh mechanism and the gear 19 is engaged, the drive shaft 21 rotates at second speed. Further, engagement of the clutch device between the synchromesh mechanism 24 and the gear 22 will produce the third speed of the drive shaft 21, and engagement of the clutch device between the synchromesh mechanism and the gear 23 causes the fourth speed rotation of the drive shaft 21. The output of the drive shaft 21 is transmitted to the front axle through the gears 30 and 31 to drive the front wheel. On the other hand, since the clutch device N is not in the engagement position with the gear 38, the rear wheel is not driven. Thus, only the front wheel is driven in the higher speed range without reduction of the sub-transmission S.

Figure 5A:
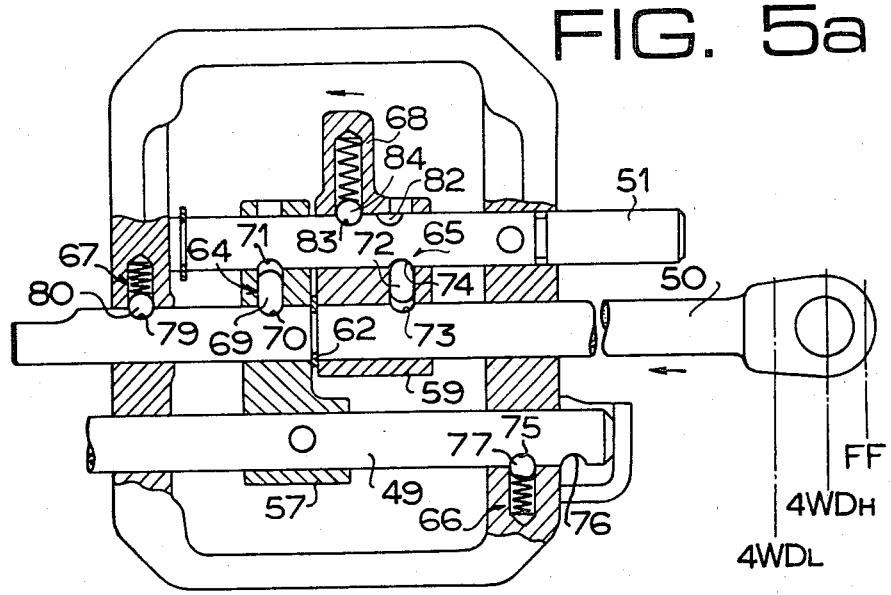
Figure 5B:
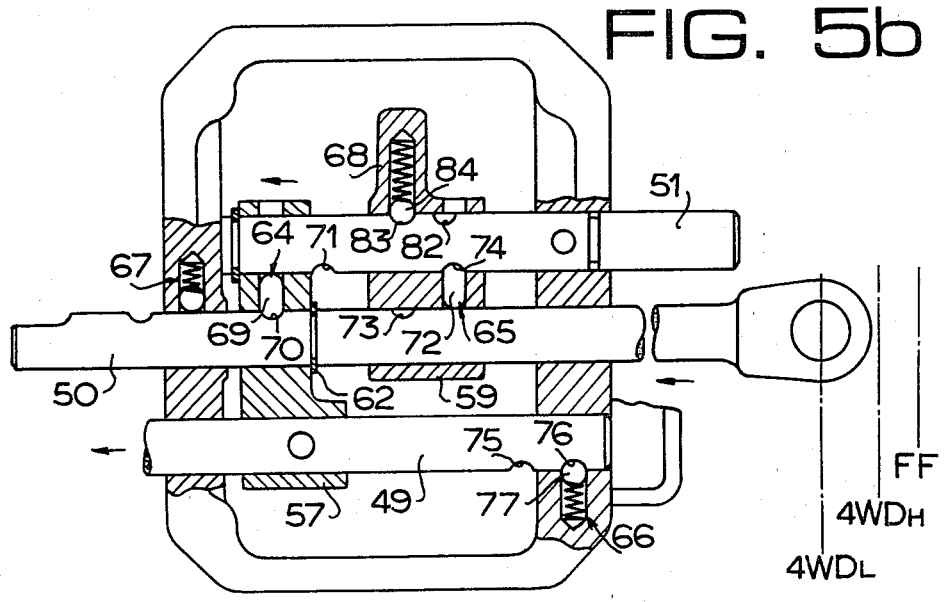

When the shift lever 54 is moved to the high speed four-wheel driving position 4WDH in FIG. 1b, the actuating rail 50 is shifted in the left direction up to the intermediate position (FIG. 5a). Since the pin 72 engages the notch 73 (FIG. 4) of the actuating rail 50, the shift fork 59 is also shifted in the left direction together with the rail 50. The arm 57 is stopped by the engagement between the pin 69 and notch 71 of the interlock means 64. When the shift fork 59 reaches the position of FIG. 5a, the ball 80 engages the notch 79 and the ball 84 engages the notch 83. Thus, the shift fork is stopped at the middle position. Thus, the sleeve 60 of the synchromesh mechanism 40 is shifted in the left direction to engage the gear 38. Accordingly, the shaft 34 is rotated through the third main drive shaft 21, the gears 37 and 38 and the sleeve 60. Since the shift rail 49 is not moved, the sub-transmission S is in the higher speed coupling stage. Thus, the front and rear wheels are driven at the higher speed range without reduction of the sub-transmission S.

When the shift lever 54 is moved to the low speed four-wheel driving position 4WDL, the actuating rail 50 is shifted to the left extreme end position. In this operation, the fork 59 stays in the position of FIG. 5a, the pin 72 is being moved by the slant of the notch 73 to engage the notch 74. The arm 57 is moved by the snap ring 62 whereby the pin 69 is shifted by the slant of the notch 71, resulting in removal from the notch 71 and engaging the notch 70. Thus, the shift rail 49 is moved together with the arm 57 and locked by engagement of the lock ball 77 with the notch 76 at the left end position. The movement of the shift rail 49 causes counterclockwise rotation of the lever 47 and shift fork 46 through the link 48 thereby to move the sleeve 41 of the synchromesh mechanism 12 to bring about the engagement between the synchromesh mechanism and the gear 11. Therefore, the rotation of the first main drive shaft 3 is transmitted to the second main drive shaft 10 with the reduction by the gears 5, 7, 8, and 11. Thus, the front and rear wheels are driven at the lower speed range.

When the shift lever 54 is moved from the position 4WDL to the position 4WDH (FIG. 5a), the arm 57 is moved together with the actuating rail 50 to thereby shift the shift rail 49 to the middle position. When the shift lever 54 is further moved to the position FF, the shift fork 59 is moved to the position FF by the snap ring 62.

From the foregoing it will be understood that the subtransmission and clutch device for the four wheel drive may be manipulated by one shift lever to change the sub-transmission and to convert into the four wheel drive. The manipulation device of the present invention is provided with a fixed rail 51 for interlocking the arm 57 and the shift fork 59. Thus, stiffness of the device is increased and deformation of members, such as the guide plate or the housing can be prevented, so that reliability of the operation can be ensured.

In the above mentioned embodiment, although the front wheels are the main drive wheels and the rear wheels are the sub-drive wheels, it is possible to modify the rear wheels so as to be the main drive wheels and the front wheels to be the sub-drive wheels.

Further, in accordance with the present invention, since the actuating rail 50 is locked by the respective two ball lock means 67 (79-81) and 68 (83-85) (against movement toward FF) or 66 (75, 77, 78) (against movement toward 4WDL) at the middle position between the first and the second moving range, the locking effect may be ensured and the manipulation feeling of the shift lever may be improved.

What is claimed is:

1. A manipulation device for a transmission apparatus of a vehicle having a first main drive shaft connected to a crankshaft of an engine through a clutch means, a sub-transmission provided adjacent to said first main drive shaft, a second main drive shaft provided adjacent said sub-transmission, said sub-transmission including reduction gear trains and a manual clutch means manually operable to select the transmitting speeds for transmitting the output of said first main drive shaft to said second main drive shaft, a third main drive shaft in parallel with said second main drive shaft, a main transmission provided on said second and third main drive shafts, means for transmitting the output of said third main drive shaft, said transmitting means comprising two transmitting systems for transmitting said output to the front axle and to the rear axle, respectively, a clutch device in one of said systems for connecting or disconnecting the transmission of the output to the corresponding said axle, comprising:

means comprising a shift rail axially slidably mounted for shifting said clutch means in said sub-transmission, an actuating rail slidably disposed in parallel with said shift rail, a fixed rail disposed in parallel with said shift rail and said actuating rail, a shift lever connected to said actuating rail, a shift fork slidably mounted on said actuating rail and said fixed rail, said shift fork being connected to said clutch device, an arm secured to said shift rail and slidably engaged with said actuating rail and said fixed rail, first interlock means provided between said actuating rail and said shift fork and said fixed rail for causing said actuating rail and said shift fork to come into fixed engagement relation to each other within a first moving range of said actuating rail, thereby to shift the shift fork by manipulating said shift lever, and for causing said shift fork and said fixed rail to engage with each other within a second moving range of said actuating rail, second interlock means provided between said actuating rail and said arm and said fixed rail for causing said actuating rail and said arm to come into fixed engagement relation to each other within the second moving range of said actuating rail adjacent said first moving range thereby to shift said shift rail, and for causing said arm and said fixed rail to engage with each other within said first moving range of said actuating rail, and means disposed between said shift fork and said arm on said actuating rail for moving said shift fork and said arm.

2. The manipulation device for a transmission apparatus in accordance with claim 1, wherein:

each of said first and second interlock means comprises, a pin radially slidably provided to achieve said fixed engagement relation, and notches each of which having slants for retracting said pin by axial movement of said actuating rail.

3. The manipulation device for a transmission apparatus in accordance with claim 1 further comprising ball lock means for locking operatively said actuating rail and shift rail at end positions of said moving ranges.

4. The manipulation device for a transmission apparatus in accordance with claim 3, wherein said ball lock means are provided between said shift rail and a supporting member thereof, between said actuating rail and a supporting member thereof, and between said fixed rail and said shift fork, said actuating rail is locked by respective two of said ball lock means at a middle position between said first and second moving ranges.

5. The manipulation device for a transmission apparatus in accordance with claim 4, wherein:

said two ball lock means are the ball lock means between said actuating rail and the supporting member thereof, and between said shift rail and the supporting member thereof and constituting means for locking said actuating rail against movement in one direction, said two ball lock means are the ball lock means between said actuating rail and the supporting member thereof, and between said fixed rail and said shift fork and constituting means for locking said actuating rail against movement in another direction.

6. The manipulation device for a transmission apparatus in accordance with claim 2, wherein:

each of said first and second interlock means respectively further comprises, said shift fork and said arm, respectively, being formed with guide slots in which said pins are slidably disposed, and portions of said fixed rail and said actuating rail defining said notches.

7. A manipulation device for a transmission apparatus of a vehicle having a first main drive shaft connected to a crankshaft of an engine through a clutch means, a sub-transmission provided adjacent to said first main drive shaft, a second main drive shaft provided adjacent said sub-transmission, said sub-transmission including reduction gear trains and a manual clutch means manually operable to select the transmitting speeds for transmitting the output of said first main drive shaft to said second main drive shaft, a third main drive shaft in parallel with said second main drive shaft, a main transmission provided on said second and third main drive shafts, means for transmitting the output of said third main drive shaft, said transmitting means comprising two transmitting systems for transmitting said output to the front axle and to the rear axle, respectively, a clutch device in one of said systems for connecting or disconnecting the transmission of the output to the corresponding said axle, comprising:

means comprising a shift rail axially slidably mounted for shifting said clutch means in said sub-transmission, an actuating rail slidably mounted in parallel with said shift rail, a fixed rail in parallel with said shift rail and said actuating rail, a shift lever connected to said actuating rail, a shift fork slidably mounted on said actuating rail and said fixed rail, said shift fork being connected to said clutch device, an arm secured to said shift rail and slidably engaged with said actuating rail and said fixed rail, first interlock means between said actuating rail and said shift fork and said fixed rail for causing said actuating rail and said shift fork to come into fixed engagement relation to each other within a first moving range of said actuating rail thereby causing shifting of the shift fork by manipulating said shift lever in one direction of movement of the actuating rail, and for causing said shift fork and said fixed rail to engage with each other within a second moving range of said actuating rail adjacent said first moving range, second interlock means between said actuating rail and said arm and said fixed rail for causing said actuating rail and said arm to come into fixed engagement relation to each other within the second moving range of said actuating rail adjacent said first moving range causing shifting of said shift rail in another direction of movement of said actuating rail, and for causing said arm and said fixed rail to engage with each other within said first moving range of said actuating rail, and means disposed on said actuating rail between said shift fork and said arm for moving said shift fork in said first moving range in said another direction of movement, and respectively, for moving said arm in said one direction of movement of the actuating rail in said second moving range.

8. The manipulation device for a transmission apparatus in accordance with claim 1 or 7, wherein:

said means for moving said shift fork and said arm is a snap ring mounted on said actuating rail.

* * * * *

UNITED STATES PATENT AND TRADEMARK OFFICE
CERTIFICATE OF CORRECTION

PATENT NO. : 4,356,879
DATED : November 2, 1982
INVENTOR(S) : Shintaro Uchiyama

It is certified that error appears in the above-identified patent and that said Letters Patent are hereby corrected as shown below:

Column 6, Line 57, (claim 3) "locking operatively"

should read --operatively locking--

Signed and Sealed this

Twenty-second Day of March 1983

[SEAL]

Attest:

GERALD J. MOSSINGHOFF

Attesting Officer *Commissioner of Patents and Trademarks*